(12) United States Patent
Tang et al.

(10) Patent No.: US 11,678,609 B2
(45) Date of Patent: Jun. 20, 2023

(54) FRUIT PICKING METHOD BASED ON VISUAL SERVO CONTROL ROBOT

(71) Applicant: Guangdong Polytechnic Normal University, Guangzhou (CN)

(72) Inventors: Yu Tang, Guangzhou (CN); Yiqing Fu, Guangzhou (CN); Jiahao Li, Guangzhou (CN); Jiepeng Yang, Guangzhou (CN); Jinfei Zhao, Guangzhou (CN); Weizhao Chen, Guangzhou (CN); Xiaodi Zhang, Guangzhou (CN); Zhiping Tan, Guangzhou (CN); Qiwei Guo, Guangzhou (CN); Xincai Zhuang, Guangzhou (CN); Huasheng Huang, Guangzhou (CN); Chaojun Hou, Guangzhou (CN); Jiajun Zhuang, Guangzhou (CN); Aimin Miao, Guangzhou (CN); Shaoming Luo, Guangzhou (CN)

(73) Assignee: GUANGDONG POLYTECHNIC NORMAL UNIVERSITY, Guangzhou (CN)

( * ) Notice: Subject to any disclaimer, the term of this patent is extended or adjusted under 35 U.S.C. 154(b) by 0 days.

(21) Appl. No.: 17/720,841

(22) Filed: Apr. 14, 2022

(65) Prior Publication Data
US 2023/0136427 A1    May 4, 2023

Related U.S. Application Data

(63) Continuation of application No. 17/710,938, filed on Mar. 31, 2022.

(30) Foreign Application Priority Data

Oct. 29, 2021  (CN) .......................... 202111268747.1

(51) Int. Cl.
*G06T 7/70* (2017.01)
*B25J 9/16* (2006.01)
(Continued)

(52) U.S. Cl.
CPC .......... *B25J 9/1664* (2013.01); *B25J 9/1697* (2013.01); *G06T 7/11* (2017.01); *G06T 7/70* (2017.01);
(Continued)

(58) Field of Classification Search
CPC ............ A01G 7/00; G01G 17/00; G01G 3/16; G01H 13/00; B25J 9/1697; B25J 9/1602; B25J 9/1664; B25J 9/1666
See application file for complete search history.

(56) References Cited

U.S. PATENT DOCUMENTS

2020/0008355 A1*  1/2020  Nir .................... A01G 3/0335
2020/0271625 A1*  8/2020  Takemoto ................ G01N 5/00

FOREIGN PATENT DOCUMENTS

CN    101807247 A  *  8/2010
CN    108029340 A  *  5/2018
(Continued)

*Primary Examiner* — Masum Billah
(74) *Attorney, Agent, or Firm* — Getech Law LLC; Jun Ye

(57) ABSTRACT

Disclosed is a fruit picking method based on a visual servo control robot, comprising: placing a throwing apparatus and a fixed photosensitive device at a first position to obtain a fixed photosensitive image; generating a first throwing path, a second throwing path, and a third throwing path; arranging recovery apparatuses; performing simultaneous rotational throwing processing to throw a first wireless photosensitive device, a second wireless photosensitive device, and a third wireless photosensitive device; receiving a first photosensitive image sequence and a second photosensitive image sequence of the first wireless photosensitive device and the second wireless photosensitive device; receiving a third (Continued)

photosensitive image sequence of the third wireless photosensitive device; generating a spatial position of a fruit on a to-be-picked fruit tree; and performing fruit picking processing using the visual servo control robot according to the spatial position of the fruit.

5 Claims, 2 Drawing Sheets

(51) Int. Cl.
*G06T 7/11* (2017.01)
*H04N 23/90* (2023.01)
*H04N 23/695* (2023.01)

(52) U.S. Cl.
CPC ........... *H04N 23/695* (2023.01); *H04N 23/90* (2023.01); *G06T 2207/10016* (2013.01); *G06T 2207/30188* (2013.01)

(56) References Cited

FOREIGN PATENT DOCUMENTS

| CN | 111673755 A | * | 9/2020 | |
|---|---|---|---|---|
| CN | 112712128 A | * | 4/2021 | |
| CN | 113099847 A | * | 7/2021 | ............. A01D 46/30 |

* cited by examiner

FRUIT PICKING METHOD BASED ON VISUAL SERVO CONTROL ROBOT

CROSS-REFERENCE TO RELATED APPLICATION

This application is a continuation of U.S. patent application Ser. No. 17/710,938, filed Mar. 31, 2022, the content of which application is hereby expressly incorporated herein by reference in its entirety.

TECHNICAL FIELD

The present application relates to the field of computers, and in particular relates to a fruit picking method and means based on a visual servo control robot, a computer apparatus and a storage medium.

BACKGROUND

The fruit picking process in the field of smart agriculture requires the determination of the spatial position of the fruit first and the use of robots for fruit picking after the spatial position of the fruit is determined. In the traditional technology, there is a scheme of determining a spatial position of the fruit using computer vision, which determines the spatial position of the fruit according to photosensitive images (similar to the composition scheme of the panorama in the electronic map). However, this scheme requires a large number of photosensitive images, and in the prior art, a large number of photosensitive images in different directions are difficult to obtain in a specific fruit picking scene, leading to low applicability.

SUMMARY

A fruit picking method based on a visual servo control robot is provided, comprising the following steps:

S1, placing a preset throwing apparatus and a fixed photosensitive device at a first position, and performing photosensitive processing on a to-be-picked fruit tree using the fixed photosensitive device, so as to obtain a fixed photosensitive image;

S2, generating a first throwing path, a second throwing path and a third throwing path based on the fixed photosensitive image according to a preset throwing path generation method, wherein the first throwing path is parallel to the second throwing path, and the first throwing path is not parallel to the third throwing path;

S3, arranging recovery apparatuses at end points of the first throwing path, the second throwing path and the third throwing path, respectively;

S4, performing simultaneous rotational throwing processing using the throwing apparatus, thus rotationally throwing a first wireless photosensitive device, a second wireless photosensitive device and a third wireless photosensitive device to the recovery apparatuses along the first throwing path, the second throwing path and the third throwing path, respectively;

S5, receiving a first photosensitive image sequence and a second photosensitive image sequence which are subjected to real-time photosensitive processing and sent by the first wireless photosensitive device and the second wireless photosensitive device in the rotational throwing process along the first throwing path and the second throwing path, respectively, wherein rotation parameters of the first wireless photosensitive device and the second wireless photosensitive device are the same as photosensitive parameters, thus sensing areas of the first wireless photosensitive device and the second wireless photosensitive device in the rotational throwing process are the same;

S6, receiving a third photosensitive image sequence which is subjected to real-time photosensitive processing and sent by the third wireless photosensitive device in the rotational throwing process along the third throwing path, wherein a sensing area of the third wireless photosensitive device in the rotational throwing process is the same as the sensing area of the first wireless photosensitive device in the rotational throwing process;

S7, generating a spatial position of a fruit on the to-be-picked fruit tree based on the fixed photosensitive image, the first photosensitive image sequence, the second photosensitive image sequence and the third photosensitive image sequence; and S8, performing fruit picking processing using a preset visual servo control robot according to the spatial position of the fruit.

Further, the throwing apparatus is capable of throwing the first wireless photosensitive device, the second wireless photosensitive device and the third wireless photosensitive device simultaneously, and the first wireless photosensitive device, the second wireless photosensitive device and the third wireless photosensitive device have different throwing starting points; the step S2 of generating a first throwing path, a second throwing path and a third throwing path based on the fixed photosensitive image according to a preset throwing path generation method, wherein the first throwing path is parallel to the second throwing path, and the first throwing path is not parallel to the third throwing path, comprises:

S201, performing area division processing on the fixed photosensitive image to divide the fixed photosensitive image into a trunk area, a branch and leaf area, and a blank area;

S202, acquiring shooting parameters of the fixed photosensitive image, and calculating a distance between the to-be-picked fruit tree and the fixed photosensitive device according to the shooting parameters;

S203, retrieving preset standard throwing parameters except for a throwing direction, and generating a first simulated throwing path, a second simulated throwing path and a third simulated throwing path according to the standard throwing parameters;

S204, adjusting throwing directions of the first simulated throwing path, the second simulated throwing path and the third simulated throwing path to make the first simulated throwing path, the second simulated throwing path and the third simulated throwing path comply with preset conditions, wherein the preset conditions are that the first simulated throwing path and the second simulated throwing path have the same throwing direction, and the third simulated throwing path has a throwing direction making an acute angle with the throwing direction of the first simulated throwing path; and the first simulated throwing path, the second simulated throwing path and the third simulated throwing path do not pass through the trunk area; and S205, recording the first simulated throwing path, the second simulated throwing path and the third simulated throwing path that comply with the preset conditions as the first throwing path, the second throwing path and the third throwing path, respectively.

Further, the step S3 of arranging recovery apparatuses at end points of the first throwing path, the second throwing path and the third throwing path respectively comprises:

S301, arranging a first barrier net at a central position of a connecting line between the end point of the first throwing path and the end point of the second throwing path using a preset first unmanned aerial vehicle, the first barrier net having a mesh aperture smaller than a preset aperture threshold, thus preventing the first wireless photosensitive device and the second wireless photosensitive device from penetrating the first barrier net; and S302, arranging a second barrier net at the end point of the third throwing path using a preset second unmanned aerial vehicle, the second barrier net having a mesh aperture smaller than a preset aperture threshold, thus preventing the third wireless photosensitive device from penetrating the second barrier net.

Further, the third wireless photosensitive device is further provided with a retractable lateral wing and an attitude adjusting chip; the attitude adjusting chip is in signal connection with the retractable lateral wing and is in signal connection with the first wireless photosensitive device and the second wireless photosensitive device, respectively, and the retractable lateral wing executes an operation of unfolding or contracting according to a control signal sent by the attitude adjusting chip; the step S6 of receiving a third photosensitive image sequence which is subjected to real-time photosensitive processing and sent by the third wireless photosensitive device in the rotational throwing process along the third throwing path, wherein a sensing area of the third wireless photosensitive device in the rotational throwing process is the same as the sensing area of the first wireless photosensitive device in the rotational throwing process, comprises:

S601, acquiring, by the attitude adjusting chip, attitude parameters of the first wireless photosensitive device, the second wireless photosensitive device and the third wireless photosensitive device in real time; and S602, sending, by the attitude adjusting chip, the control signal to the retractable lateral wing according to the attitude parameters of the first wireless photosensitive device, the second wireless photosensitive device and the third wireless photosensitive device to make the retractable lateral wing execute an operation of unfolding or contracting, thus adjusting the angular velocity of the third wireless photosensitive device in a mode of adjusting the rotational inertia of the third wireless photosensitive, so as to ensure that the sensing area of the third wireless photosensitive device in the rotational throwing process is the same as the sensing area of the first wireless photosensitive device in the rotational throwing process.

Further, the first wireless photosensitive device, the second wireless photosensitive device and the third wireless photosensitive device rotate for a plurality of circles in the throwing process, and the step S7 of generating a spatial position of a fruit on the to-be-picked fruit tree based on the fixed photosensitive image, the first photosensitive image sequence, the second photosensitive image sequence and the third photosensitive image sequence comprises:

S701, performing division processing on the fixed photosensitive image, the first photosensitive image sequence, the second photosensitive image sequence and the third photosensitive image sequence by taking the number of circles as a dividing basis, so as to correspondingly obtain a plurality of No. 1 photosensitive image sub-sequences, a plurality of No. 2 photosensitive image sub-sequences and a plurality of No. 3 photosensitive image sub-sequences;

S702, performing area labeling processing on the plurality of No. 1 photosensitive image sub-sequences, the plurality of No. 2 photosensitive image sub-sequences and the plurality of No. 3 photosensitive image sub-sequences respectively according to the throwing parameters of the first wireless photosensitive device, the second wireless photosensitive device and the third wireless photosensitive device, thus making each image in the plurality of No. 1 photosensitive image sub-sequences, the plurality of No. 2 photosensitive image sub-sequences and the plurality of No. 3 photosensitive image sub-sequences be labeled with an area for sensory processing;

S703, performing image extraction processing on the plurality of No. 1 photosensitive image sub-sequences, the plurality of No. 2 photosensitive image sub-sequences and the plurality of No. 3 photosensitive image sub-sequences respectively based on a situation that areas for sensory processing are the same, and sequentially generating a plurality of image sets, wherein the same image set consists of all photosensitive images in the same area;

S704, inputting the plurality of image sets into a preset three-dimensional model generation tool to generate a spatial three-dimensional model corresponding to the to-be-picked fruit tree; and S705, acquiring the spatial position of the fruit in the spatial three-dimensional model.

A fruit picking means based on a visual servo control robot is provided, comprising:

a fixed photosensitive image acquisition unit for placing a preset throwing apparatus and a fixed photosensitive device at a first position, and performing photosensitive processing on a to-be-picked fruit tree using the fixed photosensitive device, so as to obtain a fixed photosensitive image;

a throwing path generation unit for generating a first throwing path, a second throwing path and a third throwing path based on the fixed photosensitive image according to a preset throwing path generation method, wherein the first throwing path is parallel to the second throwing path, and the first throwing path is not parallel to the third throwing path;

a recovery apparatus arranging unit for arranging recovery apparatuses at end points of the first throwing path, the second throwing path and the third throwing path, respectively;

a rotational throwing unit for performing simultaneous rotational throwing processing by using the throwing apparatus, thus rotationally throwing a first wireless photosensitive device, a second wireless photosensitive device and a third wireless photosensitive device to the recovery apparatuses along the first throwing path, the second throwing path and the third throwing path, respectively;

a first photosensitive image sequence and second photosensitive image sequence receiving unit for receiving a first photosensitive image sequence and a second photosensitive image sequence which are subjected to real-time photosensitive processing and sent by the first wireless photosensitive device and the second wireless photosensitive device in the rotational throwing process along the first throwing path and the second throwing path, respectively, wherein rotation parameters of the first wireless photosensitive device and the second wireless photosensitive device are the same as photosensitive parameters, thus sensing areas of the first wireless photosensitive device and the second wireless photosensitive device in the rotational throwing process are the same;

a third photosensitive image sequence unit for receiving a third photosensitive image sequence which is subjected to real-time photosensitive processing and sent by the third wireless photosensitive device in the rotational throwing process along the third throwing path, wherein a sensing area of the third wireless photosensitive device in the rotational throwing process is the same as the sensing area of the first wireless photosensitive device in the rotational throwing process;

a spatial position generation unit for generating a spatial position of a fruit on the to-be-picked fruit tree based on the fixed photosensitive image, the first photosensitive image sequence, the second photosensitive image sequence and the third photosensitive image sequence; and a fruit picking unit for performing fruit picking processing using a preset visual servo control robot according to the spatial position of the fruit.

A computer apparatus is provided, comprising a memory and a processor, wherein the memory stores computer programs, and the processor implements the steps of the method in any of the above when executing the computer programs.

A computer readable storage medium having computer programs stored thereon is provided, the computer programs, when executed by a processor, implement the steps of the method in any of above.

The fruit picking method and means based on a visual servo control robot, a computer apparatus and a storage medium are provided by the present application. The method comprises: placing a preset throwing apparatus and a fixed photosensitive device at a first position to obtain a fixed photosensitive image; generating a first throwing path, a second throwing path, and a third throwing path; arranging recovery apparatuses; performing simultaneous rotational throwing processing to throw a first wireless photosensitive device, a second wireless photosensitive device, and a third wireless photosensitive device; receiving a first photosensitive image sequence and a second photosensitive image sequence of the first wireless photosensitive device and the second wireless photosensitive device; receiving a third photosensitive image sequence of the third wireless photosensitive device; generating a spatial position of a fruit on a to-be-picked fruit tree based on the fixed photosensitive image, the first photosensitive image sequence, the second photosensitive image sequence and the third photosensitive image sequence; and performing fruit picking processing using a preset visual servo control robot according to the spatial position of the fruit, thus completing the determination of the spatial position of the fruit, and then achieving fruit picking processing. There is no need to arrange photosensitive devices in a plurality of directions in the whole process, which is conducive to the rapid implementation of the whole scheme and the improvement of the fruit picking efficiency.

Achievement, functional features and advantages of the objectives of the present application will be further described with reference to the accompanying drawings and in conjunction with the embodiments.

DETAILED DESCRIPTION OF EMBODIMENTS

To make the objectives, technical solutions and advantages of the present application more clearly, the present application is further described in detail with conjunction with the accompanying drawings and the embodiments. It should be understood that specific embodiments described here are merely illustrative of the present application and are not intended to limit the present application.

Figure 1:
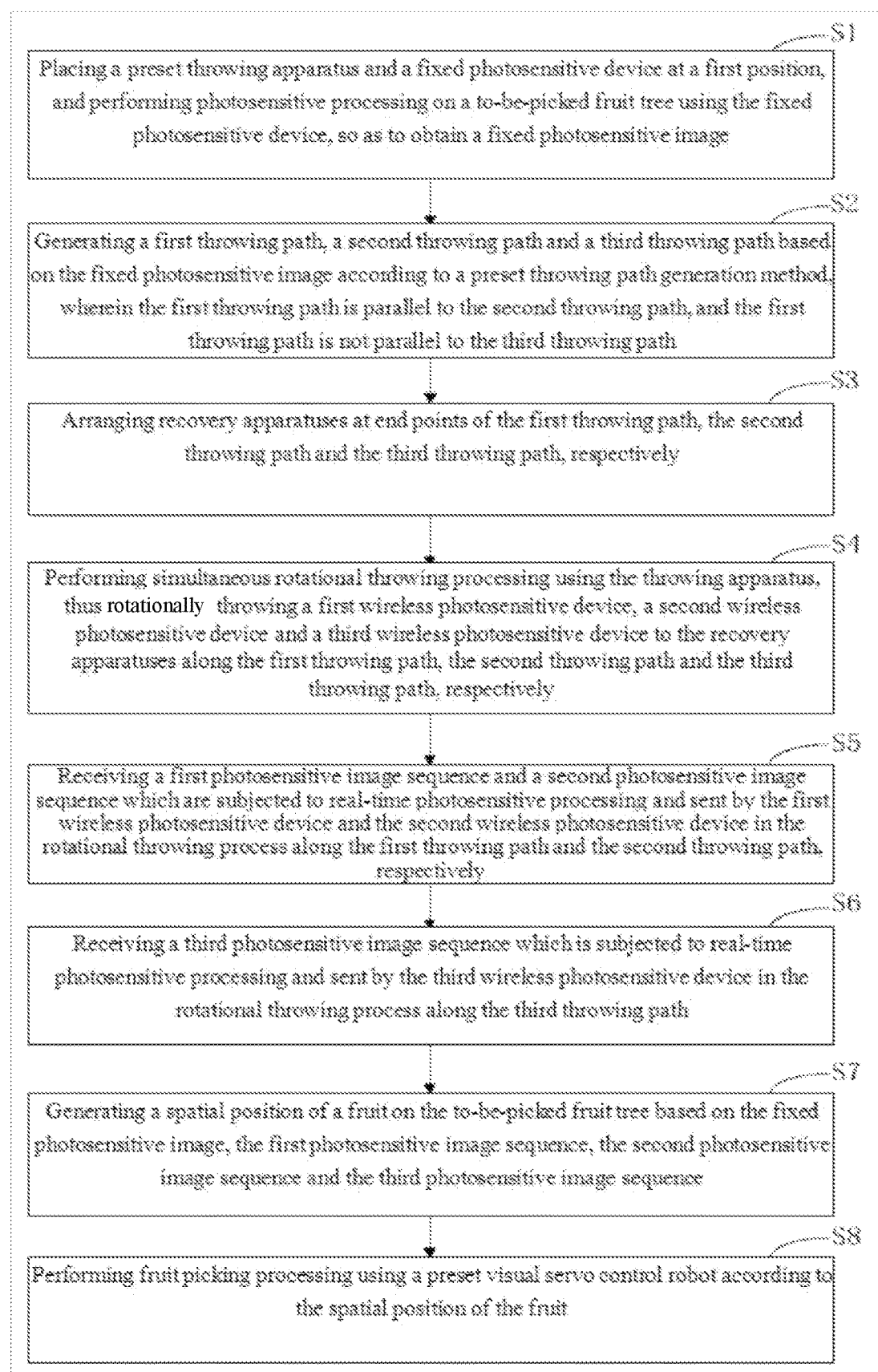
FIG. 1 is a process diagram of a fruit picking method based on a visual servo control controller of one embodiment of the present application.

Referring to FIG. 1, a fruit picking method based on a visual servo control robot is provided by an embodiment of the present application, comprising the following steps:

S1, placing a preset throwing apparatus and a fixed photosensitive device at a first position, and performing photosensitive processing on a to-be-picked fruit tree using the fixed photosensitive device, so as to obtain a fixed photosensitive image;

S2, generating a first throwing path, a second throwing path and a third throwing path based on the fixed photosensitive image according to a preset throwing path generation method, wherein the first throwing path is parallel to the second throwing path, and the first throwing path is not parallel to the third throwing path;

S3, arranging recovery apparatuses at end points of the first throwing path, the second throwing path and the third throwing path, respectively;

S4, performing simultaneous rotational throwing processing using the throwing apparatus, thus rotationally throwing a first wireless photosensitive device, a second wireless photosensitive device and a third wireless photosensitive device to the recovery apparatuses along the first throwing path, the second throwing path and the third throwing path, respectively;

S5, receiving a first photosensitive image sequence and a second photosensitive image sequence which are subjected to real-time photosensitive processing and sent by the first wireless photosensitive device and the second wireless photosensitive device in the rotational throwing process along the first throwing path and the second throwing path, respectively, wherein rotation parameters of the first wireless photosensitive device and the second wireless photosensitive device are the same as photosensitive parameters, thus sensing areas of the first wireless photosensitive device and the second wireless photosensitive device in the rotational throwing process are the same;

S6, receiving a third photosensitive image sequence which is subjected to real-time photosensitive processing and sent by the third wireless photosensitive device in the rotational throwing process along the third throwing path, wherein a sensing area of the third wireless photosensitive device in the rotational throwing process is the same as the sensing area of the first wireless photosensitive device in the rotational throwing process;

S7, generating a spatial position of a fruit on the to-be-picked fruit tree based on the fixed photosensitive image, the first photosensitive image sequence, the second photosensitive image sequence and the third photosensitive image sequence; and S8, performing fruit picking processing using a preset visual servo control robot according to the spatial position of the fruit.

As described in steps S1-S3, the preset throwing apparatus and the fixed photosensitive device are placed at the first position, and the fixed photosensitive device is used to perform photosensitive processing on the to-be-picked fruit tree, thus obtaining the fixed photosensitive image; the first throwing path, the second throwing path and the third throwing path are generated based on the fixed photosensitive image according to the preset throwing path generation method, wherein the first throwing path is parallel to the second throwing path, and the first throwing path is not parallel to the third throwing path; and the recovery apparatuses are arranged at the end points of the first throwing path, the second throwing path and the third throwing path, respectively.

Wherein the first position faces the to-be-picked fruit tree, the fixed photosensitive image obtained by performing photosensitive processing on the to-be-picked fruit tree by the fixed photosensitive device at the first position is used as the implement basis of the scheme. The fixed photosensitive device is a device capable of receiving a visible light signal, such as a camera and the like. Moreover, as the fixed photosensitive image takes the to-be-picked fruit tree as a view object, an approximate distance between the first position and the to-be-picked fruit tree can be determined based on the principle as follows: the most basic relationship among a focal length, an object distance and an image distance can be obtained using the Gaussian imaging formula, the focal length and the image distance are both known, thus the object distance between the first position and the to-be-picked fruit tree can also be calculated; although the accurate distance cannot be determined only through one fixed photosensitive image due to the depth of field, the approximate distance can be calculated, and the approximate object distance can be applied to the subsequent steps.

The first throwing path, the second throwing path and the third throwing path are then generated based on the fixed photosensitive image according to the preset throwing path generation method, wherein the first throwing path is parallel to the second throwing path, and the first throwing path is not parallel to the third throwing path. Wherein three throwing paths are required to throw the three wireless photosensitive devices, respectively, thus obtaining three photosensitive image sequences which are used to determine the spatial position of the fruit. It needs to be noted that a relative relationship among three throwing paths is that the first throwing path is parallel to the second throwing path, and the first throwing path is not parallel to the third throwing path, this is for preventing the fruit positioning from being obstructed by the branches and leaves blocking of the fruit tree. The first wireless photosensitive device and the second wireless photosensitive device are parallel in the throwing process and are the main data source, while the third wireless photosensitive device is not parallel to the first wireless photosensitive device and the second wireless photosensitive device in the throwing process and is used as a supplementary data source. Therefore, even if the photosensitive area of part of the wireless photosensitive devices is blocked by branches and leaves, the unblocked wireless photosensitive devices can be used for compensation.

Further, the throwing apparatus is capable of simultaneously throwing the first wireless photosensitive device, the second wireless photosensitive device and the third wireless photosensitive device which have different throwing starting points; and the step S2 of generating the first throwing path, the second throwing path and the third throwing path based on the fixed photosensitive image according to the preset throwing path generation method, wherein the first throwing path is parallel to the second throwing path, and the first throwing path is not parallel to the third throwing path, comprises:

S201, performing area division processing on the fixed photosensitive image to divide the fixed photosensitive image into a trunk area, a branch and leaf area, and a blank area;

S202, acquiring shooting parameters of the fixed photosensitive image, and calculating a distance between the to-be-picked fruit tree and the fixed photosensitive device according to the shooting parameters;

S203, retrieving preset standard throwing parameters except for a throwing direction, and generating a first simulated throwing path, a second simulated throwing path and a third simulated throwing path according to the standard throwing parameters;

S204, adjusting throwing directions of the first simulated throwing path, the second simulated throwing path and the third simulated throwing path to make the first simulated throwing path, the second simulated throwing path and the third simulated throwing path comply with preset conditions, wherein the preset conditions are that the first simulated throwing path and the second simulated throwing path have the same throwing direction, and the third simulated throwing path has a throwing direction making an acute angle with the throwing direction of the first simulated throwing path; and the first simulated throwing path, the second simulated throwing path and the third simulated throwing path do not pass through the trunk area; and S205, recording the first simulated throwing path, the second simulated throwing path and the third simulated throwing path that comply with the preset conditions as the first throwing path, the second throwing path and the third throwing path, respectively.

Thereof, a proper first throwing path, a proper second throwing path and a proper third throwing path are generated. It needs to be noted that the fixed photosensitive image generated by the method is actually the reflection of the cross section of the to-be-picked fruit tree, and the throwing path needs to pass through the cross section; however, the throwing path is not a straight line (the greater the throwing strength is, the closer the throwing path is to a straight line, but in practice, the closer the throwing path is to a straight line, the less effective it is, this is because the subsequent photosensitive image sequences, whose relative positions are not in the same straight line, are beneficial for the determination of the spatial position of the fruit, or for the generation of a three-dimensional model of the fruit tree. Precisely due to the characteristic of not straight line of the throwing path, the throwing path cannot be simply generated in a mode of passing through a blank area of the fixed photosensitive image through the straight line.

Accordingly, it is necessary to obtain the shooting parameters of the fixed photosensitive image and to calculate the distance between the to-be-picked fruit tree and the fixed photosensitive device based on the shooting parameters; the preset standard throwing parameters except for the throwing direction need to be retrieved, and the first simulated throwing path, the second simulated throwing path and the third simulated throwing path are generated based on the standard throwing parameters. Therefore, a relative relationship between the simulated throwing path and the fixed photosensitive image can be determined, thus reducing the possibility of collision between the simulated throwing path and the to-be-picked fruit tree as much as possible. Wherein the acquisition of the shooting parameters of the fixed photosensitive image and calculation of the distance between the to-be-picked fruit tree and the fixed photosensitive device according to the shooting parameters are based on the principle as follows: the most basic relationship among a focal length, an object distance and an image distance can be obtained using Gaussian imaging formula, the focal length and the image distance are both known, thus the object distance between the first position and the to-be-picked fruit tree can also be calculated; although the accurate distance cannot be determined only through one fixed photosensitive image due to the depth of field, the approximate distance can be calculated, and the calculated object distance at the moment is already enough for the design of the throwing path. Due to the fact that the throwing path can be determined in a mode of passing through the center of the blank area, higher tolerance is provided to adapt to the error caused by such approximate object distance. The throwing directions of the first simulated throwing path, the second simulated throwing path and the third simulated throwing path are then adjusted to make the first simulated throwing path, the second simulated throwing path and the third simulated throwing path comply with the preset conditions, wherein the preset conditions are that the first simulated throwing path and the second simulated throwing path have the same throwing direction, and the third simulated throwing path has a throwing direction making an acute angle with the throwing direction of the first simulated throwing path; and the first simulated throwing path, the second simulated throwing path and the third simulated throwing path do not pass through the trunk area.

The recovery apparatuses are respectively arranged at the end points of the first throwing path, the second throwing path and the third throwing path to enable the three wireless photosensitive devices to be recycled. The term of wireless photosensitive device is used in the present application to be distinguished from the fixed photosensitive device, i.e., three wireless photosensitive devices are thrown out, the photosensitive processing is conducted in the throwing process, and images obtained through photosensitive processing are sent to a subject of implementation (such as a fruit picking terminal which is in signal connection with the wireless photosensitive device, the fixed photosensitive device, the throwing apparatus, and the visual servo control robot).

Further, the step S3 of arranging recovery apparatuses at end points of the first throwing path, the second throwing path and the third throwing path respectively comprises:

S301, arranging a first barrier net at a central position of a connecting line between the end point of the first throwing path and the end point of the second throwing path using a preset first unmanned aerial vehicle, the first barrier net having a mesh aperture smaller than a preset aperture threshold, thus preventing the first wireless photosensitive device and the second wireless photosensitive device from penetrating the first barrier net; and S302, arranging a second barrier net at the end point of the third throwing path using a preset second unmanned aerial vehicle, the second barrier net having a mesh aperture smaller than a preset aperture threshold, thus preventing the third wireless photosensitive device from penetrating the second barrier net.

As described in steps S4-S6, the throwing apparatus is used to perform simultaneous throwing processing to throw the first wireless photosensitive device, the second wireless photosensitive device and the third wireless photosensitive device to the recovery apparatuses along the first throwing path, the second throwing path and the third throwing path, respectively; and the first photosensitive image sequence and the second photosensitive image sequence which are subjected to real-time photosensitive processing and sent by the first wireless photosensitive device and the second wireless photosensitive device in the rotational throwing process along the first throwing path and the second throwing path are received; wherein the rotation parameters of the first wireless photosensitive device and the second wireless photosensitive device are the same as the photosensitive parameters, thus the sensing areas of the first wireless photosensitive device and the second wireless photosensitive device in the rotational throwing process are the same; and the third photosensitive image sequence which is subjected to real-time photosensitive processing and sent by the wireless photosensitive device in the rotational throwing process along the third throwing path is received, wherein the sensing area of the third wireless photosensitive device in the rotational throwing process is the same as the sensing area of the first wireless photosensitive device in the rotational throwing process.

In the present application, three wireless photosensitive devices need to be subjected to simultaneous rotational throwing processing to guarantee that, in the photosensitive processing process, not only are the photosensitive images of the same area acquired, but also the photosensitive images of the same time, thus avoiding the influence of noise signals as much as possible. It can be known from above that the first throwing path, the second throwing path and the third throwing path cannot collide with one another, or almost not collide with one another, therefore, the attitudes, positions, photosensitive directions and photosensitive areas of the first wireless photosensitive device, the second wireless photosensitive device and the third wireless photosensitive device in the throwing process are known. The first photosensitive image sequence and the second photosensitive image sequence which are subjected to real-time photosensitive processing and sent by the first wireless photosensitive device and the second wireless photosensitive device in the rotational throwing process along the first throwing path and the second throwing path are then received; wherein the rotation parameters of the first wireless photosensitive device and the second wireless photosensitive device are the same as the photosensitive parameters, thus the sensing areas of the first wireless photosensitive device and the second wireless photosensitive device in the rotational throwing process are the same. At the moment, the first photosensitive image sequence and the second photosensitive image sequence obtained by performing photo-sensitive processing by the first wireless photosensitive device and the second wireless photosensitive device can already be used as the basis for determining the spatial position of the fruit, and the principle is the same as the principle that the distance cannot be sensed by a single eye of a person but the distance can be sensed by eyes of the person. Therefore, in the spatial position determination process simulating binocular observation, it is necessary to guarantee that the rotation parameters of the first wireless photosensitive device and the second wireless photosensitive device are the same as the photosensitive parameters, and therefore the sensing areas of the first wireless photosensitive device and the second wireless photosensitive device in the rotational throwing process are the same, and the throwing trajectories of the first wireless photosensitive device and the second wireless photosensitive device are parallel to each other.

Although the first wireless photosensitive device and the second wireless photosensitive device are employed in principle to achieve spatial positioning of the fruit, there is a possibility of branch and leaf blocking when the method of the present application is applied to a special fruit collection scene. Therefore, the third photosensitive image sequence which is subjected to real-time photosensitive processing and sent by the third wireless photosensitive device in the rotational throwing process along the third throwing path is received, wherein the spatial positioning accuracy of the fruit can be improved by employing a mode that the sensing area of the third wireless photosensitive device in the rotational throwing process is the same as the sensing area of the first wireless photosensitive device in the rotational throwing process.

Further, the third wireless photosensitive device is further provided with a retractable lateral wing and an attitude adjusting chip; the attitude adjusting chip is in signal connection with the retractable lateral wing and is in signal connection with the first wireless photosensitive device and the second wireless photosensitive device, respectively, and the retractable lateral wing executes an operation of unfolding or contracting according to a control signal sent by the attitude adjusting chip; the step S6 of receiving a third photosensitive image sequence which is subjected to real-time photosensitive processing and sent by the third wireless photosensitive device in the rotational throwing process along the third throwing path, wherein a sensing area of the third wireless photosensitive device in the rotational throwing process is the same as the sensing area of the first wireless photosensitive device in the rotational throwing process, comprises:

S601, acquiring, by the attitude adjusting chip, attitude parameters of the first wireless photosensitive device, the second wireless photosensitive device and the third wireless photosensitive device in real time; and S602, sending, by the attitude adjusting chip, the control signal to the retractable lateral wing according to the attitude parameters of the first wireless photosensitive device, the second wireless photosensitive device and the third wireless photosensitive device to make the retractable lateral wing execute an operation of unfolding or contracting, thus adjusting the angular velocity of the third wireless photosensitive device in a mode of adjusting the rotational inertia of the third wireless photosensitive, so as to ensure that the sensing area of the third wireless photosensitive device in the rotational throwing process is the same as the sensing area of the first wireless photosensitive device in the rotational throwing process.

Therefore, it is guaranteed that the sensing area of the third wireless photosensitive device in the rotational throwing process is the same as the sensing area of the first wireless photosensitive device in the rotational throwing process. Due to the fact that the throwing trajectories of the first wireless photosensitive device and the second wireless photosensitive device are parallel, the sensing areas of the first wireless photosensitive device and the second wireless photosensitive device are easy to be the same. However, the throwing trajectory of the third wireless photosensitive device is not parallel to the two throwing trajectories. Therefore, if the three wireless photosensitive devices have the same rotation parameters, the same sensing areas in the rotational throwing process cannot be ensured, while the same sensing areas in the rotational throwing process need to be ensured in the present application to guarantee that the photosensitive images at the same time and in the same area are sensed. To achieve an objective of sensing the photosensitive images at the same time and in the same area, the third wireless photosensitive device is further provided with the retractable lateral wing and the attitude adjusting chip; the attitude adjusting chip is in signal connection with the retractable lateral wing and is in signal connection with the first wireless photosensitive device and the second wireless photosensitive device, respectively, and the retractable lateral wing executes an operation of unfolding or contracting according to a control signal sent by the attitude adjusting chip; in the throwing process, the control signal is sent to the retractable lateral wing to make the retractable lateral wing execute the operation of unfolding or contracting, thus adjusting the angular velocity of the third wireless photosensitive device in a mode of adjusting the rotational inertia of the third wireless photosensitive device, so as to ensure that the sensing area of the third wireless photosensitive device in the rotational throwing process is the same as the sensing area of the first wireless photosensitive device in the rotational throwing process.

Specifically, in the throwing process of the third wireless photosensitive device, the third wireless photosensitive device is not affected by other external forces except for gravity, thus the angular momentum is conserved (or called the angular momentum in the horizontal plane is conserved, and meanwhile, the rotation directions of the three wireless photosensitive devices are preferably horizontal rotation). According to the formula: angular momentum=moment of inertia×angular velocity, moment of inertia=mass×square of the distance of the mass point from the center of rotation, it is known that when the retractable lateral wing is unfolded, the moment of inertia increases and the angular velocity decreases; conversely, the moment of inertia decreases and the angular velocity increases. According to the formula, the angular velocity of the third wireless photosensitive device can be adjusted, an current sensing area and the future sensing area of the first wireless photosensitive device and the second wireless photosensitive device can be known according to the attitude parameters of the first wireless photosensitive device and the second wireless photosensitive device, and according to the current sensing area of the third wireless sensing device, the angular velocity that the third wireless photosensitive device should have to ensure that the sensing areas are the same in the rotational throwing process can be known, thus the control signal can be sent to the retractable lateral wing, accordingly.

As described in steps S7-S8, a spatial position of a fruit on the to-be-picked fruit tree is generated based on the fixed photosensitive image, the first photosensitive image sequence, the second photosensitive image sequence and the third photosensitive image sequence, and the fruit picking processing is conducted using the preset visual servo control robot according to the spatial position of the fruit.

Wherein the mode of generating the spatial position of the fruit on the to-be-picked fruit tree may adopt any feasible mode. In principle, the spatial position of the fruit on the to-be-picked fruit tree can be generated (which is similar to the construction scheme of a panorama in an electronic map) by only employing two of the first photosensitive image sequence, the second photosensitive image sequence and the third photosensitive image sequence (it needs to be noted that each image sequence comprises a plurality of images, and that the rotation is periodic, thus for a certain specific area, sensing positions of the photosensitive images which periodically occur in one photosensitive image sequence in fact but at the same area in different periods are different, and the data volume is expanded), there are a plurality of techniques in this aspect, which will not be repeated herein, and the techniques can be achieved through the assistance of common model construction tools, such as Autodesk123D, 3DS0MPro, reparo, and the like. On this basis, the negative effects caused by the blocking of branches and leaves can be avoided based on the fixed photosensitive image, the first photosensitive image sequence, the second photosensitive image sequence and the third photosensitive image sequence. The fruit picking processing is then conducted using the preset visual servo control robot according to the spatial position of the fruit. The visual servo control robot is characterized in that an image of a real object is automatically received and processed through optical means and a non-contact sensor, and the robot is enabled to perform further control or corresponding self-adaptive adjustment behaviors through information fed back by the image, or, more specifically, the visual servo control robot of the present application refers to a robot with a servo motor, and the control signal of the servo motor is based on the spatial position of the fruit.

Further, prior to the step S7 of generating the spatial position of the fruit on the to-be-picked fruit tree based on the fixed photosensitive image, the first photosensitive image sequence, the second photosensitive image sequence and the third photosensitive image sequence, the method further comprises employing a fruit recognition model based on the convolutional neural network model to recognize the fruit in the fixed photosensitive image.

Further, the first wireless photosensitive device, the second wireless photosensitive device and the third wireless photosensitive device rotate for a plurality of circles in the throwing process, and the step S7 of generating a spatial position of a fruit on the to-be-picked fruit tree based on the fixed photosensitive image, the first photosensitive image sequence, the second photosensitive image sequence and the third photosensitive image sequence comprises:

S701, performing division processing on the fixed photosensitive image, the first photosensitive image sequence, the second photosensitive image sequence and the third photosensitive image sequence by taking the number of circles as a dividing basis, so as to correspondingly obtain a plurality of No. 1 photosensitive image sub-sequences, a plurality of No. 2 photosensitive image sub-sequences and a plurality of No. 3 photosensitive image sub-sequences;

S702, performing area labeling processing on the plurality of No. 1 photosensitive image sub-sequences, the plurality of No. 2 photosensitive image sub-sequences and the plurality of No. 3 photosensitive image sub-sequences respectively according to the throwing parameters of the first wireless photosensitive device, the second wireless photosensitive device and the third wireless photosensitive device, thus making each image in the plurality of No. 1 photosensitive image sub-sequences, the plurality of No. 2 photosensitive image sub-sequences and the plurality of No. 3 photosensitive image sub-sequences be labeled with an area for sensory processing;

S703, performing image extraction processing on the plurality of No. 1 photosensitive image sub-sequences, the plurality of No. 2 photosensitive image sub-sequences and the plurality of No. 3 photosensitive image sub-sequences respectively based on a situation that areas for sensory processing are the same, and sequentially generating a plurality of image sets, wherein the same image set consists of all photosensitive images in the same area;

S704, inputting the plurality of image sets into a preset three-dimensional model generation tool to generate a spatial three-dimensional model corresponding to the to-be-picked fruit tree; and S705, acquiring the spatial position of the fruit in the spatial three-dimensional model.

Further, the preset three-dimensional model generation tool may be any feasible tool, such as Autodesk123D, 3DS0MPro, reparo and other tools. The image division in the plurality of steps aims to enable the photosensitive images in the same area to be divided in the same image set to facilitate the generation of the spatial three-dimensional model. In addition, comparison between the images may need to be involved in the whole process to find the same part, while the algorithm involved in this part is a common image algorithm, which is not limited by the present application. In addition, a picking robot employed by the present application is based on the visual servo control robot instead of an ordinary picking robot, which is matched with a fruit position determination scheme of the present application. Due to the use of a servo control strategy, the position of the robot can be adjusted at any time (including a position of a robotic arm in contact with or in relative contact with the fruit).

The fruit picking method based on the visual servo control robot of the present application comprises: placing a preset throwing apparatus and a fixed photosensitive device at a first position to obtain a fixed photosensitive image; generating a first throwing path, a second throwing path, and a third throwing path; arranging recovery apparatuses; performing simultaneous rotational throwing processing to throw a first wireless photosensitive device, a second wireless photosensitive device, and a third wireless photosensitive device; receiving a first photosensitive image sequence and a second photosensitive image sequence of the first wireless photosensitive device and the second wireless photosensitive device; receiving a third photosensitive image sequence of the third wireless photosensitive device; generating a spatial position of a fruit on a to-be-picked fruit tree based on the fixed photosensitive image, the first photosensitive image sequence, the second photosensitive image sequence and the third photosensitive image sequence; and performing fruit picking processing using a preset visual servo control robot according to the spatial position of the fruit, thus completing the determination of the spatial position of the fruit, and then achieving fruit picking processing. There is no need to arrange photosensitive devices in multiple directions in the whole process, which is conducive to the rapid implementation of the whole scheme and the improvement of the fruit picking efficiency.

A fruit picking means based on a visual servo control robot is provided by an embodiment of the present application, comprising:

a fixed photosensitive image acquisition unit for placing a preset throwing apparatus and a fixed photosensitive device at a first position, and performing photosensitive processing on a to-be-picked fruit tree using the fixed photosensitive device, so as to obtain a fixed photosensitive image;

a throwing path generation unit for generating a first throwing path, a second throwing path and a third throwing path based on the fixed photosensitive image according to a preset throwing path generation method, wherein the first throwing path is parallel to the second throwing path, and the first throwing path is not parallel to the third throwing path;

a recovery apparatus arranging unit for arranging recovery apparatuses at end points of the first throwing path, the second throwing path and the third throwing path, respectively;

a rotational throwing unit for performing simultaneous rotational throwing processing by using the throwing apparatus, thus rotationally throwing a first wireless photosensitive device, a second wireless photosensitive device and a third wireless photosensitive device to the recovery apparatuses along the first throwing path, the second throwing path and the third throwing path, respectively;

a first photosensitive image sequence and second photosensitive image sequence receiving unit for receiving a first photosensitive image sequence and a second photosensitive image sequence which are subjected to real-time photosensitive processing and sent by the first wireless photosensitive device and the second wireless photosensitive device in the rotational throwing process along the first throwing path and the second throwing path, respectively, wherein rotation parameters of the first wireless photosensitive device and the second wireless photosensitive device are the same as photosensitive parameters, thus sensing areas of the first wireless photosensitive device and the second wireless photosensitive device in the rotational throwing process are the same;

a third photosensitive image sequence unit for receiving a third photosensitive image sequence which is subjected to real-time photosensitive processing and sent by the third wireless photosensitive device in the rotational throwing process along the third throwing path, wherein a sensing area of the third wireless photosensitive device in the rotational throwing process is the same as the sensing area of the first wireless photosensitive device in the rotational throwing process;

a spatial position generation unit for generating a spatial position of a fruit on the to-be-picked fruit tree based on the fixed photosensitive image, the first photosensitive image sequence, the second photosensitive image sequence and the third photosensitive image sequence; and a fruit picking unit for performing fruit picking processing using a preset visual servo control robot according to the spatial position of the fruit.

Wherein the operations respectively executed by the units are in one-to-one correspondence with the steps of the fruit picking method based on the visual servo control robot according to the embodiment and are not repeated in detail here.

A fruit picking means based on a visual servo control robot is provided, comprising the following operations: placing a preset throwing apparatus and a fixed photosensitive device at a first position to obtain a fixed photosensitive image; generating a first throwing path, a second throwing path, and a third throwing path; arranging recovery apparatuses; performing simultaneous rotational throwing processing to throw a first wireless photosensitive device, a second wireless photosensitive device, and a third wireless photosensitive device; receiving a first photosensitive image sequence and a second photosensitive image sequence of the first wireless photosensitive device and the second wireless photosensitive device; receiving a third photosensitive image sequence of the third wireless photosensitive device; generating a spatial position of a fruit on a to-be-picked fruit tree based on the fixed photosensitive image, the first photosensitive image sequence, the second photosensitive image sequence and the third photosensitive image sequence; and performing fruit picking processing using a preset visual servo control robot according to the spatial position of the fruit, thus completing the determination of the spatial position of the fruit, and then achieving fruit picking processing. There is no need to arrange photosensitive devices in multiple directions in the whole process, which is conducive to the rapid implementation of the whole scheme and the improvement of the fruit picking efficiency.

Figure 2:
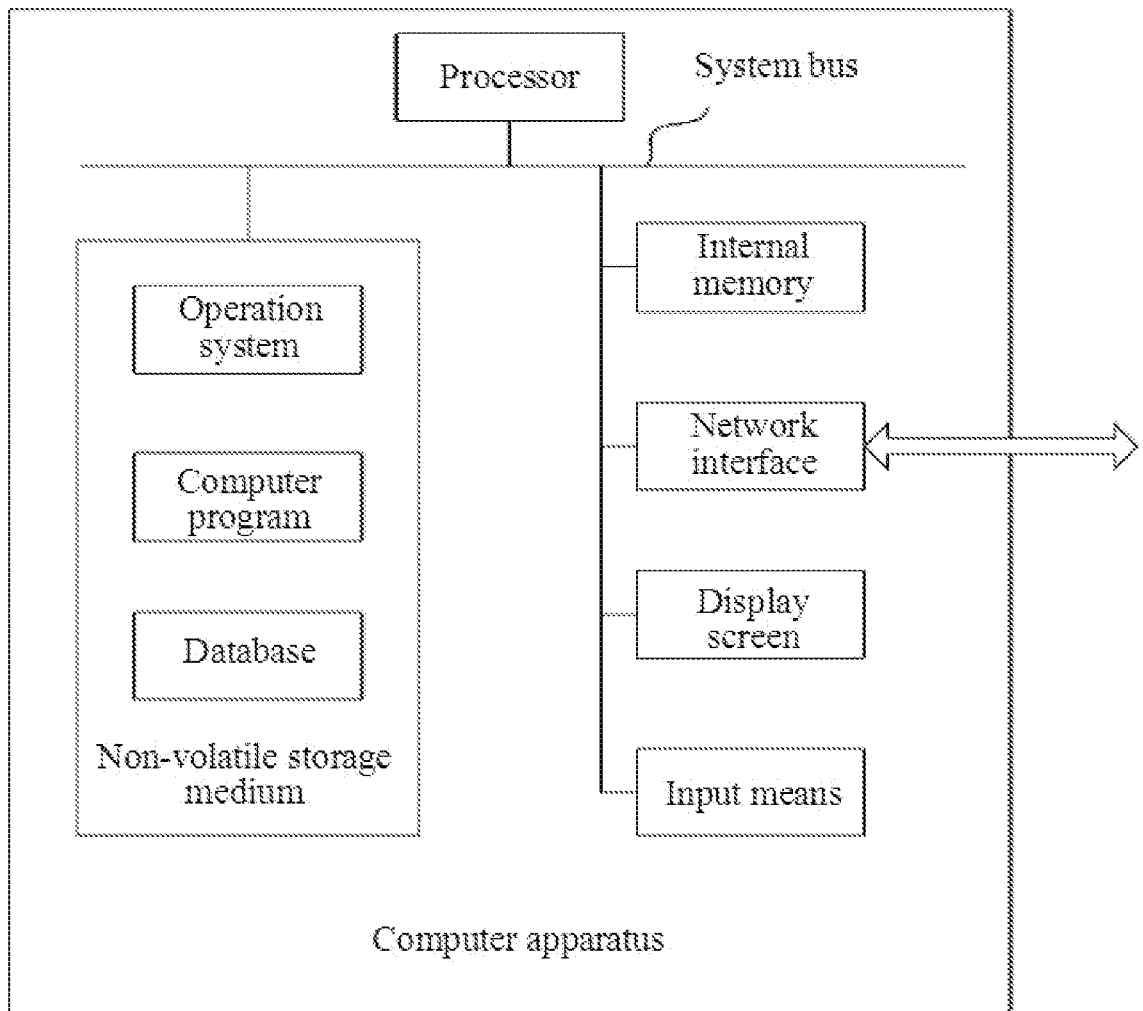
FIG. 2 is a structure schematic block diagram of a computer apparatus of one embodiment of the present application.

Referring to FIG. 2, a computer apparatus is further provided in the embodiment of the present invention, the computer apparatus nay be a server, an internal structure of which may be as shown in the figure. The computer apparatus comprises a processor, a memory, a network interface and a database which are connected by a system bus. Wherein the processor of the computer apparatus is used for providing capability of calculation and control. The memory of the computer apparatus comprises a non-volatile storage medium and an internal memory. The non-volatile storage medium stores an operation system, computer programs, and a database. The internal memory provides an environment for the operation of the operation system and the computer program in the non-volatile storage medium. The database of the computer apparatus is used for storing data used by the fruit picking method based on the visual servo control robot. The network interface of the computer apparatus is used for communicating with an external terminal via network connection. The computer programs, when executed by the processor, implement a fruit picking method based on the visual servo control robot.

The processor executes the fruit picking method based on the visual servo control robot, wherein the steps included in the method correspond to the steps of executing the fruit picking method based on the visual servo control robot of the above embodiment in a one-to-one manner, and will not be repeated in detail here.

It may be understood by those of ordinary skill in the art that the structures shown in the figures are merely block diagrams of partial structures associated with the solution of the present application and do not constitute limitations of the computer apparatus to which the solution of the present application is applied.

In accordance with the computer apparatus provided by the present application, the method comprises: placing a preset throwing apparatus and a fixed photosensitive device at a first position to obtain a fixed photosensitive image; generating a first throwing path, a second throwing path, and a third throwing path; arranging recovery apparatuses; performing simultaneous rotational throwing processing to throw a first wireless photosensitive device, a second wireless photosensitive device, and a third wireless photosensitive device; receiving a first photosensitive image sequence and a second photosensitive image sequence of the first wireless photosensitive device and the second wireless photosensitive device; receiving a third photosensitive image sequence of the third wireless photosensitive device; generating a spatial position of a fruit on a to-be-picked fruit tree based on the fixed photosensitive image, the first photosensitive image sequence, the second photosensitive image sequence and the third photosensitive image sequence; and performing fruit picking processing using a preset visual servo control robot according to the spatial position of the fruit, thus completing the determination of the spatial position of the fruit, and then achieving fruit picking processing. There is no need to arrange photosensitive devices in a plurality of directions in the whole process, which is conducive to the rapid implementation of the whole scheme and improving the improvement of the fruit picking efficiency.

A computer readable storage medium having computer programs stored thereon is further provided in one embodiment of the present application, the computer programs, when executed by a processor, implement a fruit picking method based on a visual servo control robot, wherein the steps included in the method correspond to the steps of executing the fruit picking method based on the visual servo control robot of the above embodiment in a one-to-one manner, and will not be repeated in detail here.

In accordance with the computer readable storage medium, the method comprises: placing a preset throwing apparatus and a fixed photosensitive device at a first position to obtain a fixed photosensitive image; generating a first throwing path, a second throwing path, and a third throwing path; arranging recovery apparatuses; performing simultaneous rotational throwing processing to throw a first wireless photosensitive device, a second wireless photosensitive device, and a third wireless photosensitive device; receiving a first photosensitive image sequence and a second photosensitive image sequence of the first wireless photosensitive device and the second wireless photosensitive device; receiving a third photosensitive image sequence of the third wireless photosensitive device; generating a spatial position of a fruit on a to-be-picked fruit tree based on the fixed photosensitive image, the first photosensitive image sequence, the second photosensitive image sequence and the third photosensitive image sequence; and performing fruit picking processing using a preset visual servo control robot according to the spatial position of the fruit, thus completing the determination of the spatial position of the fruit, and then achieving fruit picking processing. There is no need to arrange photosensitive devices in a plurality of directions in the whole process, which is conducive to the rapid implementation of the whole scheme and the improvement of the fruit picking efficiency.

It can be understood by those of ordinary skill in the art that implementation of all or part of the processes of the methods described above may be accomplished by hardware associated with computer programs or instructions, the computer programs may be stored in a non-volatile computer-readable storage medium, and the computer program, when executed, may comprise processes such as those described above for each embodiment of the method. Wherein any reference to memory, storage, database, or other medium provided herein and used in the embodiments may include non-volatile and/or volatile memory. The non-volatile memory may comprise a read-only memory (ROM), a programmable ROM (PROM), an electric programmable ROM (EPROM), an electrically erasable programmable ROM (EEPROM) or a flash memory. The volatile memory may comprise a random access memory (RAM) or an external cache memory. As an illustration instead of a limitation, the RANI is available in various forms, such as static RANI (SRAM), dynamic RANI (DRAM), synchronous DRAM (SDRAM), dual data rate SDRAM (DDRS-DRAM), enhanced SDRAM (ESDRAM), synchronous link (Synchlink) DRAM (SLDRAM), Rambus direct RAM (RDRAM), direct Rambus dynamic RANI (DRDRAM), and Rambus dynamic RANI (RDRAM).

It needs to be noted that the terms comprise, include judgment result any other variation thereof herein are intended to cover non-exclusive inclusion, thus making a process, a means, an object, or a method that comprises a series of elements includes not only those elements, but also other elements not expressly listed, or elements inherent in such process, means, article, or method. An element defined by the statement "comprises a . . . " does not, without more constraints, exclude the existence of additional identical elements in the process, means, article, or method that comprises the element.

The above is only a preferred embodiment of the present application and is not intended to limit the scope of patent for the present application. Equivalent structure or equivalent flow transformation made by utilizing the contents of the specification and drawings of the present application or direct or indirect application in other related technical fields are included in the scope of patent protection of the present application in a similar way.

What is claimed is:

1. A fruit picking method based on a visual servo control robot, comprising:

S1, placing a preset throwing apparatus and a fixed photosensitive device at a first position, and performing photosensitive processing on a to-be-picked fruit tree using the fixed photosensitive device, so as to obtain a fixed photosensitive image;

S2, generating a first throwing path, a second throwing path and a third throwing path based on the fixed photosensitive image according to a preset throwing path generation method, wherein the first throwing path is parallel to the second throwing path, and the first throwing path is not parallel to the third throwing path;

S3, arranging recovery apparatuses at end points of the first throwing path, the second throwing path and the third throwing path, respectively;

S4, performing simultaneous rotational throwing processing using the throwing apparatus, thus rotationally throwing a first wireless photosensitive device, a second wireless photosensitive device and a third wireless photosensitive device to the recovery apparatuses along the first throwing path, the second throwing path and the third throwing path, respectively, wherein the first wireless photosensitive device, the second wireless photosensitive device, and the third wireless photosensitive device are configured to capture multiple images on the first throwing path, the second throwing path, and the third throwing path respectively;

S5, receiving a first photosensitive image sequence and a second photosensitive image sequence which are subjected to real-time photosensitive processing and sent by the first wireless photosensitive device and the second wireless photosensitive device in the rotational throwing process along the first throwing path and the second throwing path, respectively, wherein rotation parameters of the first wireless photosensitive device and the second wireless photosensitive device are the same as photosensitive parameters, thus sensing areas of the first wireless photosensitive device and the second wireless photosensitive device in the rotational throwing process are the same;

S6, receiving a third photosensitive image sequence which is subjected to real-time photosensitive processing and sent by the third wireless photosensitive device in the rotational throwing process along the third throwing path, wherein a sensing area of the third wireless photosensitive device in the rotational throwing process is the same as the sensing area of the first wireless photosensitive device in the rotational throwing process;

S7, generating a spatial position of a fruit on the to-be-picked fruit tree based on the fixed photosensitive image, the first photosensitive image sequence, the second photosensitive image sequence and the third photosensitive image sequence; and S8, performing fruit picking processing using a preset visual servo control robot according to the spatial position of the fruit.

2. The fruit picking method based on the visual servo control robot according to claim 1, wherein the throwing apparatus is capable of throwing the first wireless photosensitive device, the second wireless photosensitive device and the third wireless photosensitive device simultaneously, and the first wireless photosensitive device, the second wireless photosensitive device and the third wireless photosensitive device have different throwing starting points; the step S2 of generating a first throwing path, a second throwing path and a third throwing path based on the fixed photosensitive image according to a preset throwing path generation method, where the first throwing path is parallel to the second throwing path, and the first throwing path is not parallel to the third throwing path, comprises:

S201, performing area division processing on the fixed photosensitive image to divide the fixed photosensitive image into a trunk area, a branch and leaf area, and a blank area;

S202, acquiring shooting parameters of the fixed photosensitive image, and calculating a distance between the to-be-picked fruit tree and the fixed photosensitive device according to the shooting parameters;

S203, retrieving preset standard throwing parameters except for a throwing direction, and generating a first simulated throwing path, a second simulated throwing path and a third simulated throwing path according to the standard throwing parameters;

S204, adjusting throwing directions of the first simulated throwing path, the second simulated throwing path and the third simulated throwing path to make the first simulated throwing path, the second simulated throwing path and the third simulated throwing path comply with preset conditions, wherein the preset conditions are that the first simulated throwing path and the second simulated throwing path have the same throwing direction, and the third simulated throwing path has a throwing direction making an acute angle with the throwing direction of the first simulated throwing path; and the first simulated throwing path, the second simulated throwing path and the third simulated throwing path do not pass through the trunk area; and S205, recording the first simulated throwing path, the second simulated throwing path and the third simulated throwing path that comply with the preset conditions as the first throwing path, the second throwing path and the third throwing path, respectively.

3. The fruit picking method based on the visual servo control robot according to claim 1, wherein the step S3 of arranging recovery apparatuses at end points of the first throwing path, the second throwing path and the third throwing path respectively comprises:

S301, arranging a first barrier net at a central position of a connecting line between the end point of the first throwing path and the end point of the second throwing path using a preset first unmanned aerial vehicle, the first barrier net having a mesh aperture smaller than a preset aperture threshold, thus preventing the first wireless photosensitive device and the second wireless photosensitive device from penetrating the first barrier net; and S302, arranging a second barrier net at the end point of the third throwing path using a preset second unmanned aerial vehicle, the second barrier net having a mesh aperture smaller than a preset aperture threshold, thus preventing the third wireless photosensitive device from penetrating the second barrier net.

4. The fruit picking method based on the visual servo control robot according to claim 1, wherein the third wireless photosensitive device is further provided with a retractable lateral wing and an attitude adjusting chip; the attitude adjusting chip is in signal connection with the retractable lateral wing and is in signal connection with the first wireless photosensitive device and the second wireless photosensitive device, respectively, and the retractable lateral wing executes an operation of unfolding or contracting according to a control signal sent by the attitude adjusting chip; the step S6 of receiving a third photosensitive image sequence which is subjected to real-time photosensitive processing and sent by the third wireless photosensitive device in the rotational throwing process along the third throwing path, wherein a sensing area of the third wireless photosensitive device in the rotational throwing process is the same as the sensing area of the first wireless photosensitive device in the rotational throwing process, comprises:

S601, acquiring, by the attitude adjusting chip, attitude parameters of the first wireless photosensitive device, the second wireless photosensitive device and the third wireless photosensitive device in real time; and S602, sending, by the attitude adjusting chip, the control signal to the retractable lateral wing according to the attitude parameters of the first wireless photosensitive device, the second wireless photosensitive device and the third wireless photosensitive device to make the retractable lateral wing execute an operation of unfolding or contracting, thus adjusting the angular velocity of the third wireless photosensitive device in a mode of adjusting the rotational inertia of the third wireless photosensitive, so as to ensure that the sensing area of the third wireless photosensitive device in the rotational throwing process is the same as the sensing area of the first wireless photosensitive device in the rotational throwing process.

5. The fruit picking method based on the visual servo control robot according to claim 1, wherein the first wireless photosensitive device, the second wireless photosensitive device and the third wireless photosensitive device rotate for a plurality of circles in the throwing process, and the step S7 of generating a spatial position of a fruit on the to-be-picked fruit tree based on the fixed photosensitive image, the first photosensitive image sequence, the second photosensitive image sequence and the third photosensitive image sequence comprises:

S701, performing division processing on the fixed photosensitive image, the first photosensitive image sequence, the second photosensitive image sequence and the third photosensitive image sequence by taking the number of circles as a dividing basis, so as to correspondingly obtain a plurality of No. 1 photosensitive image sub-sequences, a plurality of No. 2 photosensitive image sub-sequences and a plurality of No. 3 photosensitive image sub-sequences;

S702, performing area labeling processing on the plurality of No. 1 photosensitive image sub-sequences, the plurality of No. 2 photosensitive image sub-sequences and the plurality of No. 3 photosensitive image sub-sequences respectively according to the throwing parameters of the first wireless photosensitive device, the second wireless photosensitive device and the third wireless photosensitive device, thus making each image in the plurality of No. 1 photosensitive image sub-sequences, the plurality of No. 2 photosensitive image sub-sequences and the plurality of No. 3 photosensitive image sub-sequences be labeled with an area for sensory processing;

S703, performing image extraction processing on the plurality of No. 1 photosensitive image sub-sequences, the plurality of No. 2 photosensitive image sub-sequences and the plurality of No. 3 photosensitive image sub-sequences respectively based on a situation that areas for sensory processing are the same, and sequentially generating a plurality of image sets, wherein the same image set consists of all photosensitive images in the same area;

S704, inputting the plurality of image sets into a preset three-dimensional model generation tool to generate a spatial three-dimensional model corresponding to the to-be-picked fruit tree; and S705, acquiring the spatial position of the fruit in the spatial three-dimensional model.

* * * * *